United States Patent Office 3,254,952
Patented June 7, 1966

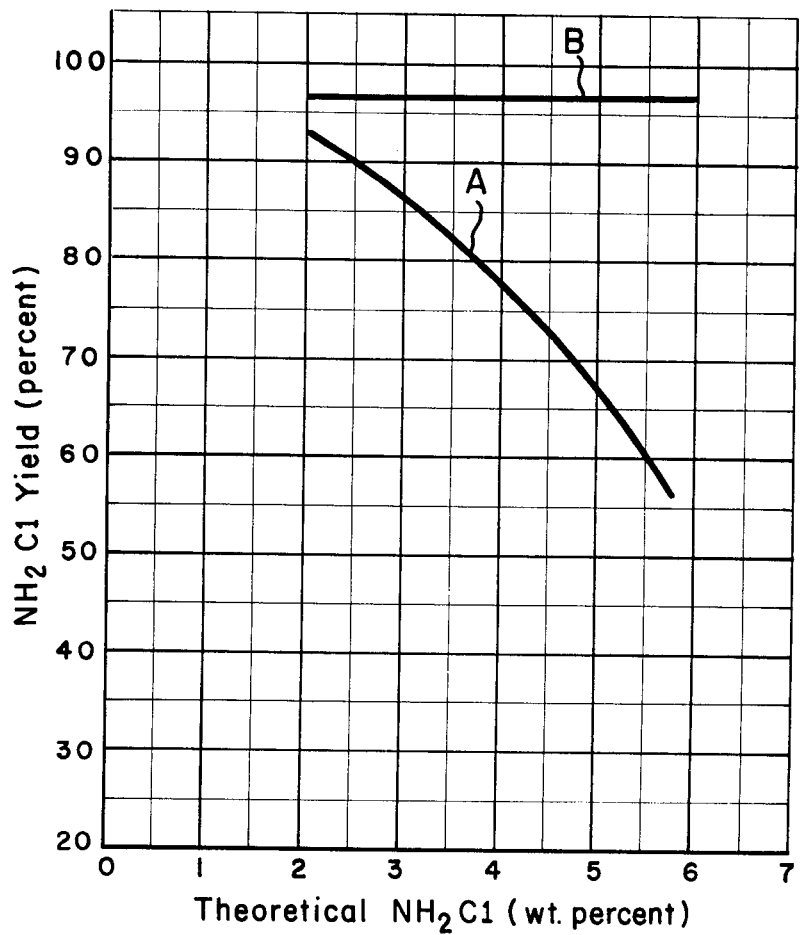
INVENTORS:
CHARLES W. RALEIGH and
RAYMOND N. MESIAH

3,254,952
PREPARATION OF CHLORAMINE
Charles Walter Raleigh, West Windsor Township, Mercer County, and Raymond Neal Mesiah, Franklin Township, Somerset County, N.J., assignors to FMC Corporation, New York, N.Y., a corporation of Delaware
Filed Aug. 17, 1962, Ser. No. 217,654
5 Claims. (Cl. 23—190)

This invention relates to an improvement in the preparation of hydrazine and alkyl hydrazines by the Raschig process in which chloramine is produced and employed as an intermediate reagent in the reaction.

Hydrazine and aliphatic substituted hydrazines—e.g., monomethylhydrazine—are currently produced by means of the Raschig synthesis. In the first step of this process, ammonia and sodium hypochlorite are reacted at low temperatures to form chloramine and sodium hydroxide according to the following equation:

$$NH_3 + NaOCl \rightarrow NH_2Cl + NaOH \qquad \text{Eq. 1}$$

The reaction mixture containing chloramine is then reacted with excess ammonia or with primary or secondary amines to form a corresponding hydrazine product according to the following equation:

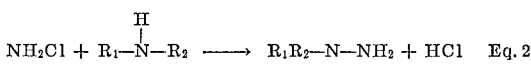

where $R_1$ and $R_2$ are aliphatic, cycloaliphatic or heterocyclic groups or hydrogen.

One drawback to this process is the low concentration of chloramine that is obtained in the resultant aqueous solution. In general, chloramine concentrations above about 3.5% are not produced by this process. Efforts is increase the concentration of chloramine in the aqueous reaction mixture have not been successful. For example, increasing the concentration of reactants, i.e., the ammonia and/or sodium hypochlorite, does not increase the chloramine concentration; instead, the percent yield decreases with increased concentrations of feed reactants. This is most serious since it is customary to employ chloramine as it is recovered from the chloramine reactor without further processing to produce hydrazine and alkyl hydrazines; this avoids having the rather unstable chloramine decompose upon standing. As a result, the theoretical concentration of hydrazine or substituted hydrazines which can be produced from a given amount of feed stream is necessarily limited by the low concentrations of chloramine which are introduced into the hydrazine reactor. Because of this serious drawback, there has been a need for a method that would increase the concentration of chloramine in the intermediate product stream and that would thus increase the recoverable concentration of hydrazine or substituted hydrazines produced in the final step of the above process.

It is the principal object of the present invention to overcome these deficiencies in prior art processes and to produce higher chloramine concentrations in the aqueous chloramine product stream.

These and other objects will be apparent from the following disclosure.

We have now found that higher concentrations of chloramine, up to more than double the concentration obtained in prior are processes, can be obtained when ammonia and sodium hypochlorite are reacted together in the presence of a reagent (an acceptor) capable of removing hydroxide ions from solution in an amount sufficient to remove at least 25% (and preferably at least 90%) of the hydroxyl ions derived from the sodium hydroxide which is formed in-situ during the reaction; the acceptor can be an acid, a water-soluble acid salt or a water-soluble neutral salt containing magnesium, zinc or calcium ions. Surprisingly, not only are concentrations of chloramine increased drastically, but yields based on hypochlorite are substantially increased over prior art processes.

We have further discovered that very high percentage yields of hydrazine or alkyl substituted hydrazines are obtainable from these higher concentration chloramine solutions by reacting such chloramine solutions with additional ammonia or with primary or secondary amines in the presence of sufficient added alkali metal hydroxide to reach a hydroxide to chloramine mole ratio of about 1:1 at the commencement of the reaction. The amount of hydroxide added generally corresponds to the amount which reacts with the acceptor during the chloramine synthesis.

It is quite surprising that higher concentrations of chloramine can be obtained by preventing hydroxyl ions from being produced along with the chloramine. Apparently, as the chloramine concentration begins increasing in the aqueous reaction mixture, the presence of the in-situ formed hydroxide prevents a build-up in the chloramine concentration above about 3.5%.

This is graphically illustrated in the drawing. The drawing is a plot of the chloramine reaction carried out in Example I in which the theoretical concentrations of chloramine are plotted against the percent yields of chloramine actually obtained. Curve A demonstrates the results which are obtained when the in-situ formed hydroxide is not treated with an acceptor during the formation of the chloramine. Curve B shows the results obtained when 90% of the hydroxide formed in-situ is treated with an acceptor in the reaction mixture. As can be seen from the drawing, the percent yield of chloramine illustrated by Curve B remains constantly high, above 95% of the theoretical yield of chloramine; in contrast, the percent yield of chloramine illustrated by Curve A drops off sharply. Note that the actual concentration of chloramine is the product of the theoretical concentration and the percent yield.

While reaction of the hydroxide with the acceptor is necessary when producing chloramine, it has been found that the reaction of chloramine with either ammonia or a primary or secondary amine to produce the corresponding hydrazine product does not result in good yields unless the hydroxide which has been previously treated with an acceptor is replaced. This necessitates adding an alkali metal hydroxide to the chloramine solution before it is contacted with either ammonia or the amine to form the corresponding hydrazine product.

It is most surprising that while the acceptor treatment of the hydroxide is necessary to permit the formation of richer chloramine solutions, the addition of an alkali metal hydroxide to the chloramine, once it is formed, does not decompose the chloramine. In practice, the loss of chloramine, upon addition of an alkali metal hydroxide, is negligible. The resultant rich chloramine solutions, upon addition of the alkali metal hydroxide, can be reacted with either ammonia or a primary or secondary amine to give high yields of the corresponding hydrazine.

An ancillary advantage of the present process is that higher yields of hydrazine product are produced in a more concentrated solution, thereby facilitating recovery of the hydrazine product from the aqueous mixture. This is most improtant since a sizable amount of water must be removed in order to obtain a pure product. Under such conditions, a small increase in the concentration of the product in the crude reaction mixture results in a sizable decrease in the amount of water which must be separated.

In carrying out the present invention, chloramine is produced by making up an aqueous ammonia solution containing glue or other sequestering agent and sufficient amounts of an acceptor to react with at least 25% of the in situ produced hydroxyl ion. The solution is then cooled to about 0° C. and a pre-cooled solution of sodium hypochlorite is then added. Chloramine is produced at a rapid rate upon the addition of the sodium hypochlorite solution. In order to produce a hydrazine product, sufficient alkaline metal hydroxide is added to the chloramine solution to replace the hydroxyl ion that reacted with the acceptor so that the final solution has an alkali metal hydroxide to chloramine mole ratio of about 1:1. To the chloramine solution thus treated with a hydroxide, is added either ammonia or a primary or secondary amine; the ensuing reaction takes place at a temperature of about 20° to 140° C. to yield the corresponding hydrazine product.

In the above procedure for producing chloramine, the aqueous ammonia solution is used in amounts sufficient to supply 2 moles of ammonia per mole of sodium hypochlorite to be used. Higher mole ratios of ammonia to sodium hypochlorite, e.g., 6:1, can be employed but do not increase the yield of chloramine; decreasing the mole ratio of ammonia to sodium hypochlorite to 1.5:1, decreases the chloramine yield slightly. In general, mole ratios of ammonia to sodium hypochlorite, on the order of about 2:1, are preferred.

The acceptor which is added to the above solution instantaneously reacts with the hydroxyl ions produced by the reaction. The acceptor may be an acid such as hydrochloric acid, a water-soluble acid salt such as ammonium chloride, or a water-soluble magnesium, calcium or zinc salt such as calcium chloride or zinc chloride. The term, "acid salt," as employed in the specification and claims, means a salt which yields a pH lower than 7 when dissolved in water. The acid or acid salt reacts with the sodium hydroxide formed during the chloramine synthesis in a simple acid-base reaction. The water-soluble calcium, magnesium or zinc salt precipitates out the hydroxyl ion derived from the permanent base, sodium hydroxide. This latter reaction occurs according to the following equation:

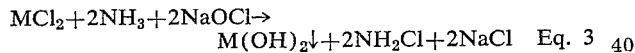

$$MCl_2 + 2NH_3 + 2NaOCl \rightarrow M(OH)_2\downarrow + 2NH_2Cl + 2NaCl \quad \text{Eq. 3}$$

where M=Ca, Zn or Mg.

Among the acids and water-soluble acid salts which can be employed as acceptors are hydrochloric acid, sulfuric acid, phosphoric acid, acetic acid, ammonium chloride and ammonium sulfate. The only limitation on the selection of the acid or water-soluble acid salt is that it does not oxidize or react with the final product or the feed chemicals. For this reason, an oxidizing acid such as nitric acid is unsuitable since it reacts with both the chloramine and the hydrazine product. Typical water-soluble calcium and zinc salts which have been found operative as acceptors include $CaCl_2$, $CaBr_2$, $ZnSO_4$, $ZnCl_2$, $ZnBr_2$, $MgSO_4$ and $MgCl_2$.

When an acid salt is employed as the acceptor, it is preferred that an ammonium salt such as ammonium chloride be employed since this prevents contamination of the solution with foreign metal cations. If ammonium chloride is employed as the acceptor, it supplies ammonium values to the ammonia solution and therefore can be used to supply a portion of the total necessary ammonia values. This is advantageous because it reduces the amount of ammonia that must be supplied to the reactor.

When chloramine is to be produced in the aqueous reaction mixture in amounts above about 5% by weight, the acceptor is employed in amounts sufficient to react with at least about 90% of the sodium hydroxide formed during the chloramine synthesis. If chloramine solutions below about 5% are to be recovered, reaction of 50% of the in situ formed sodium hydroxide results in high yields of chloramine. Where chloramine solutions of about 3.5% are desired, reaction of only about 25% of the in situ formed sodium hydroxide results in increased yields.

The sequestering agent, such as glue or gelatin, which is conventionally added to the aqueous ammonia solution, does not affect the production of chloramine; it is added to deactivate metal ions such as copper which reduce the yield of hydrazine product in the second stage of the process. The use of glue for this purpose is well known in this type of synthesis, and requires no further description. The sequestering agent is added directly to the chloramine reactor because the aqueous chloramine solution which is recovered from the chloramine reactor is employed without further processing to produce the final hydrazine product. While it is possible to add the sequestering agent to the aqueous chloramine reaction product after its formation, for convenience sake it is added to the aqueous ammonia solution employed in producing the chloramine. The amount of glue or other sequestering agent required is not critical, except that enough should be present to sequester all metal ions that catalyze the decomposition of hydrazine product, e.g., copper, manganese, etc. Amounts sufficient to supply at least 0.15% in the final chloramine solution have been found to be satisfactory.

The aqueous solution thus formulated is then cooled to about 0° C. The solution can be cooled to lower temperatures, e.g., −4° C., but care should be taken to avoid freezing the solution. To this solution is added pre-cooled sodium hypochlorite. The sodium hypochlorite is added preferably in the mole ratio of 1:2 with respect to ammonia. The reaction between the ammonia and sodium hypochlorite is very rapid and the reaction readily goes to completion. The resultant aqueous reaction mixture contains chloramine in concentrations up to about 7.6%. The chloramine reaction can be carried out at temperatures ranging from −10° C. to +20° C. without any noticeable change in yields. The temperatures of the reaction solution should not be allowed to rise beyond above about 20° C. since chloramine decomposes rapidly at higher temperatures.

In carrying out the above reaction, it is necessary that the acceptor be added to the ammonia solution prior to adding the sodium hypochlorite solution. Otherwise, the acceptor cannot perform its function of reacting with the alkaline metal hydroxide as it is formed in-situ during the chloramine reaction. Further, if high yields of chloramine are to be obtained, the sodium hypochlorite is desirably added to the ammonia solution. For continuous reactions, a mixing T can be satisfactorily employed. If the order of addition of the reactants is altered and the ammonia solution is added to the sodium hypochlorite, lower yields of chloramine are obtained.

The acceptor may be added to the aqueous ammonia solution in amounts sufficient to react with all of the alkaline hydroxide formed in-situ during the chloramine reaction, although reaction of about 90% of the hydroxide is sufficient, regardless of the concentration of chloramine produced. In any event, the acceptor should not be added in amounts greater than required to react with all of the in-situ produced hydroxide since this might alter the alkaline conditions required to carry out the process. The chloramine reaction is generally carried out in aqueous solutions having a pH of about 11.

In the second stage of this process, the aqueous chloramine solution thus produced is reacted with either ammonia or a primary or secondary amine to form the corresponding hydrazine product. The amines can contain alkyl, cycloalkyl and heterocyclic radicals. The amines which have been found particularly suitable are primary or secondary amines containing alkyl groups having from 1 to about 6 carbon atoms. Among the primary and secondary amines (including imines) which have been found suitable are monomethylamine, dimethylamine, monoethylamine, diethylamine, methylethylamine, isopropylamine, butylamine, isobutylamine, amylamine, monohexylamine, cyclohexylamine, hexamethyleneimine, piperidine, monoheptylamine and others.

In carrying out this second stage of the reaction, the aqueous or anhydrous amine such as monomethylamine or ammonia is added to a reactor. The freshly prepared chloramine reaction mixture produced in the manner previously described, which is prepared for reaction with ammonia or an amine by adding sodium hydroxide in the amount sufficient to yield a solution having a mole ratio of chloramine to sodium hydroxide on the order of about 1:1, is added to the amine.

It is mandatory that the hydroxide which has reacted with the acceptor during the formation of the chloramine be replaced before the chloramine solution is reacted with ammonia or a primary or secondary amine to produce the corresponding hydrazine product. Apparently, an alkali metal hydroxide is necessary for the formation of hydrazines in good yields, as illustrated by Equation 2. For example, yields of 1.4% of hydrazine are produced when NaOH is not replaced in the chloramine solution; under identical conditions, the yield was improved to 60% when NaOH was replaced in the chloramine solution.

The mole ratio of amine, such as monomethylamine, to chloramine employed for producing an alkyl hydrazine is about 8:1. Increasing yields of the alkyl hydrazine, such as monomethylhydrazine, can be obtained by increasing the amine to chloramine ratio to as high as 30:1. The use of an anhydrous amine in place of an aqueous amine can be employed with at least the same yields as the aqueous amine, and in some cases even higher. When ammonia is reacted with chloramine to produce hydrazine, the mole ratio of ammonia to chloramine employed is at least about 20:1. Mole ratios as high as 50:1 are quite frequently employed. An increase in hydrazine yields has been obtained under plant operation where even higher mole ratios of ammonia to chloramine are maintained.

By controlling the rate of addition of the chloramine solution to either the ammonia or alkylamine, and by employing heat exchange means, the temperature in the reactor is maintained at from about 20° to 140° C. To form hydrazine, temperatures of 70° to 140° C. are preferred. To form substituted hydrazines, temperatures of 20° to 50° C. are preferred. The reaction mixture is maintained at this temperature for sufficient time to complete the reaction. Thereafter, the reaction mixture is distilled to remove excess ammonia and/or amine. The desired product is separated from the impurities by conventional means well known in the art. For example, in the case of hydrazine, the remaining solution is fed into an evaporator to remove salt and subjected to rectification to recover a final hydrazine product. In the case of monomethylhydrazine, which forms an azeotrope with water, sodium hydroxide is added in the final rectification to break the azeotrope and secure a pure monomethylhydrazine product.

The following examples are presented by way of illustration only and are not deemed to be limiting of the present invention.

EXAMPLE I

In a series of runs, sodium hypochlorite (12% solution) at a temperature of about −10° C., was added to an aqueous ammoniacal solution maintained at a temperature of about −4° C. The mole ratio of ammonia to sodium hypochlorite was 2:1. The amount of ammonia and sodium hypochlorite employed was sufficient to obtain the theoretical yields of chloramine listed in Table 1. The actual yields and concentrations of chloramine obtained are also listed in Table 1.

The above procedure was repeated except that ammonium chloride was added to the ammoniacal solution in amounts sufficient to react with 90% of the hydroxide produced during the reaction. The actual yields and concentrations of chloramine obtained are reported in Table 2.

Table 1.—Chloramine yields without $NH_4Cl$ addition

| Theoretical $NH_2Cl$ Concentration Obtainable (wt. percent) | Yield of $NH_2Cl$ Obtained | |
| --- | --- | --- |
| | Concentration (wt. percent) | Percent of Theory |
| 2.0 | 1.86 | 93 |
| 2.2 | 2.03 | 92 |
| 2.3 | 2.09 | 91 |
| 2.5 | 2.26 | 90 |
| 2.9 | 2.53 | 87 |
| 3.1 | 2.61 | 84 |
| 3.3 | 2.71 | 82 |
| 3.5 | 2.84 | 81 |
| 3.9 | 3.08 | 79 |
| 4.5 | 3.24 | 72 |
| 5.2 | 3.38 | 65 |
| 5.5 | 3.30 | 60 |
| 5.8 | 3.25 | 56 |

Table 2.—Chloramine yields with $NH_4Cl$ addition

| Theoretical $NH_2Cl$ Concentration Obtainable (wt. percent) | Yield of $NH_2Cl$ Obtained | |
| --- | --- | --- |
| | Concentration (wt. percent) | Percent of Theory |
| 2.0 | 1.92 | 96 |
| 3.35 | 3.20 | 96 |
| 4.50 | 4.36 | 97 |
| 5.00 | 4.85 | 97 |
| 5.50 | 5.25 | 96 |
| 6.00 | 5.70 | 96 |
| 7.89 | 7.53 | 96 |
| 8.00 | 7.58 | 95 |

EXAMPLE II

Run A.—Two hundred grams of 12% sodium hypochlorite (at −10° C.) was added, with mixing, to 318 grams of an aqueous solution (at 0° C.) containing 3.45% ammonia and 0.3% glue. The temperature was maintained at −2° C. to +5° C. by means of an ice bath. The chloramine solution, which immediately formed, was then rapidly mixed with 165 grams of anhydrous ammonia and the solution immediately heated at 125° C. to 135° C. for 2 minutes. By this method, a chloramine yield of 73% and a hydrazine yield of 48% (based on sodium hypochlorite) were obtained.

Run B.—In a similar experiment, the above procedure was followed except that $NH_4Cl$ was added to the ammonia solution prior to the addition of the sodium hypochlorite so as to react with 90% of the theoretical amount of sodium hydroxide that would form. After the sodium hypochlorite was added, enough sodium hydroxide (as a 50% solution) was added to replace that which reacted with the acid salt. The chloramine solution was then reacted with anhydrous ammonia in the same manner as described above. A chloramine yield of 95% and a hydrazine yield of 61% (based on sodium hypochlorite) were obtained.

EXAMPLE III

Run A.—Two hundred grams of 12% sodium hypochlorite (at −10° C.) was added, with mixing, to 122 grams of an aqueous solution (at 0° C.) of 8.2% ammonia and 0.5% glue. The temperature was maintained at −5° C. to +1° C. by means of an ice bath. The chloramine solution, which immediately formed, was then rapidly mixed with 120 grams of anhydrous monomethylamine and the solution heated at 50–55° C. for 15 minutes. The chloramine yield was 65%. The monomethylhydrazine yield, based on sodium hypochlorite, was 56% (2.6% concentration).

Run B.—In a similar experiment, the above procedure was followed except that $NH_4Cl$ was added to the ammonia solution prior to the addition of the sodium hypochlorite so as to react with 90% of the sodium hydroxide that would form in the reaction. After the sodium hypochlorite was added, enough sodium hydroxide was added (as a 50% solution) to replace that which reacted with the acid salt. The chloramine solution was then reacted with anhydrous monomethylamine in the same manner as described above. The chloramine yield was 98%. The monomethylhydrazine yield, based on sodium hypochlorite was 80% (3.2% concentration).

EXAMPLE IV

*Run A.*—Two hundred grams of 12% sodium hypochlorite solution (at −10° C.) was added with mixing to 122 grams of an aqueous solution (at 0° C.) of 8.2% ammonia and 0.5% glue. The temperature was maintained at −5° C. to 0° C. by means of an ice bath. The chloramine solution, which immediately formed, was then rapidly mixed with 116 grams of anhydrous dimethylamine and the solution heated at 35° C. to 42° C. for 12 minutes. The chloramine yield was 63%. The unsymmetrical dimethylhydrazine yield, based on sodium hypochlorite, was 61% (2.7% concentration).

*Run B.*—In a similar experiment, the above procedure was followed except that hydrochloric acid was added to the ammonia solution prior to the addition of the sodium hypochlorite so as to react with 90% of the sodium hydroxide that would form in the reaction. After the sodium hypochlorite was added, enough sodium hydroxide was added (as a 50% solution) to replace that which reacted with the acid. The chloramine solution was then reacted with anhydrous dimethylamine in the same manner as described above. The chloramine yield was 98%. The unsymmetrical dimethylhydrazine yield, based on sodium hypochlorite, was 86% (3.6% concentration).

EXAMPLE V

*Run A.*—One hundred forty-eight grams of 12.1% sodium hypochlorite (at −10- C.) was added with mixing to 99 grams of an aqueous solution (at 0° C.) containing 8.5% ammonia, 1% glue and enough calcium chloride to precipitate 60% of the theoretical amount of sodium hydroxide that would be formed in the reaction. The temperature was maintained at −4° C. to +1° C. by means of an ice bath. To the chloramine solution, which immediately formed, was then added enough sodium hydroxide (as a 50% solution) to replace the hydroxyl ions which had been precipitated out by the calcium chloride. The solution was then mixed with 438 grams of 28% aqueous ammonia solution and heated to 45° C. to 50° C. for 15 minutes. By this method, a chloramine yield of 84% and a hydrazine yield of 56%, based on sodium hypochlorite, were obtained.

*Run B.*—In a similar experiment in which the calcium chloride and sodium hydroxide additions were omitted, a chloramine yield of 63% and a hydrazine yield of 35% (based on sodium hypochlorite) were obtained.

EXAMPLE VI

The procedure of Example V, Run A, was repeated in two separate runs in which magnesium chloride and zinc chloride wlre alternately substituted for calcium chloride. The results obtained were on the same order as with calcium chloride.

EXAMPLE VII

*Run A.*—A 106 gram sample of 12% sodium hypochlorite (at −10° C.) was added with mixing to 170 grams of 5.2% ammonia and 0.5% glue. The temperature was maintained at −5° C. to +1° C. by means of an ice bath. The chloramine yield after completion of the reaction was 84%.

*Run B.*—In a similar experiment, the above procedure was followed except that $NH_4Cl$ was added to the ammonia solution prior to the addition of the sodium hypochlorite so as to react with 25% of the sodium hydroxide that would form in the reaction. The chloramine yield was 91%.

EXAMPLE VIII

*Run A.*—Two hundred grams of 12% sodium hypochlorite (at −10° C.) was added, with mixing, to 122 grams of an aqueous solution (at 0° C.) of 8.2% ammonia and 0.5% glue. The temperature was maintained at −5° C. to +1° C. by means of an ice bath. The chloramine solution, which immediately formed, was then rapidly mixed with 330 grams of anhydrous piperidine and the solution heated at 50–55° C. for 15 minutes. The chloramine yield was 65%. The N-amino piperidine yield, based on sodium hypochlorite, was 58%.

*Run B.*—In a similar experiment, the above procedure was followed except that $NH_4Cl$ was added to the ammonia solution prior to the addition of the sodium hypochlorite so as to react with 90% of the sodium hydroxide that would form in the reaction. After the sodium hypochlorite was added, enough sodium hydroxide was added (as a 50% solution) to replace that which reacted with the acid salt. The chloramine solution was then reacted with anhydrous piperidine in the same manner as described above. The chloramine yield was 98%. The N-amino piperidine yield, based on sodium hypochlorite, was 77%.

EXAMPLE IX

The following runs were carried out for the continuous production of monomethylhydrazine.

*Run A.*—A 12% sodium hypochlorite solution (at °0 C.) was continually mixed with an aqueous solution of ammonia (at 0° C.) and glue, using a mixing T. The mole ratio of sodium hypochlorite to ammonia was maintained at 2:1 and the reaction carried out at about 0°C. The concentrations of ammonia and sodium hypochlorite used were sufficient to give a theoretical chloramine concentration of 5%. The aqueous chloramine-containing reaction mixture thus produced was continually added to anhydrous monomethylamine. The mole ratio of monomethylamine to sodium hypochlorite originally introduced was maintained at about 30:1. This latter reaction was carried out at a temperature of 35° C. The yield of monomethylhydrazine was 62%, based on the sodium hypochlorite introduced.

*Run B.*—The above process was repeated except that $NH_4Cl$ was added to the ammonia solution prior to the addition of the sodium hypochlorite so as to react with 90% of the sodium hydroxide that would be formed in the reaction. After the chloramine was produced, enough sodium hydroxide was added (as a 50% solution) to replace that which reacted with the $NH_4Cl$. Thereafter, the chloramine solution was reacted with the monomethylamine in the same manner as Run A. The monomethylhydrazine yield was 88%, based on the sodium hypochlorite introduced.

Pursuant to the requirements of the patent statutes, the principle of this invention has been explained and exemplified in a manner so that it can be readily practiced by those skilled in the art, such exemplification including what is considered to be the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for producing chloramine by reaction of ammonia and sodium hypochlorite at a temperature of from −10° C. to +20° C., which comprises adding said sodium hypochlorite to a solution of said ammonia and an acceptor selected from the group consisting of an acid, a water soluble acid salt and a water-soluble salt containing a metal cation selected from the group consisting of calcium, magnesium and zinc, said acceptor being added in amounts to react instantaneously with at least about 25% of the sodium hydroxide produced in-situ during said reaction.

2. Process of claim 1 in which the ammonia is present in greater than stoichiometric amounts required for reaction with said sodium hypochlorite.

3. Process of claim 1 in which $NH_4Cl$ is employed as the acceptor.

4. Process of claim 1 in which HCl is employed as the acceptor.

5. Process of claim 1 in which the acceptor is added in amounts to react with at least 90% of said NaOH produced in-situ.

References Cited by the Examiner

UNITED STATES PATENTS

| 2,678,258 | 5/1954 | Haller | 23—190 |
| 2,806,851 | 9/1957 | Sisler et al. | 260—583 |
| 2,863,728 | 12/1958 | Sisler et al. | 23—190 |
| 2,901,511 | 8/1959 | Hurley | 260—569 X |

OTHER REFERENCES

Drago: "Chloramine," Journal of Chemical Education, volume 34, No. 11, November 1957, pages 541–545.

Mellor: "A Comprehensive Treatise on Inorganic and Theoretical Chemistry," Longhmans, Green & Co., New York, New York volume 2, 1922, pages 507 and 508.

BENJAMIN HENKIN, *Primary Examiner.*

MAURICE A. BRINDISI, *Examiner.*

E. C. THOMAS, J. J. BROWN, *Assistant Examiners.*